(12) United States Patent
Bottasso et al.

(10) Patent No.: US 11,738,859 B2
(45) Date of Patent: Aug. 29, 2023

(54) ROTOR FOR A HOVER-CAPABLE AIRCRAFT

(71) Applicant: LEONARDO S.P.A., Rome (IT)

(72) Inventors: Luigi Bottasso, Samarate (IT); Ermanno Fosco, Samarate (IT); Paolo Pisani, Samarate (IT); Francesco Vincenzo, Samarate (IT); Francesco Rosa, Samarate (IT); Francesco Braghin, Samarate (IT); Gabriele Cazzulani, Samarate (IT); Simone Cinquemani, Samarate (IT)

(73) Assignee: LEONARDO S.P.A., Rome (IT)

(*) Notice: Subject to any disclaimer, the term of this patent is extended or adjusted under 35 U.S.C. 154(b) by 50 days.

(21) Appl. No.: 17/627,462

(22) PCT Filed: Jun. 25, 2020

(86) PCT No.: PCT/IB2020/056024
§ 371 (c)(1),
(2) Date: Jan. 14, 2022

(87) PCT Pub. No.: WO2021/014235
PCT Pub. Date: Jan. 28, 2021

(65) Prior Publication Data
US 2022/0258856 A1 Aug. 18, 2022

(30) Foreign Application Priority Data
Jul. 19, 2019 (EP) .................................... 19187420

(51) Int. Cl.
*B64C 27/00* (2006.01)

(52) U.S. Cl.
CPC ...... *B64C 27/001* (2013.01); *B64C 2027/003* (2013.01); *B64C 2027/004* (2013.01); *B64C 2027/005* (2013.01)

(58) Field of Classification Search
CPC ............ B64C 27/001; B64C 2027/003; B64C 2027/005
See application file for complete search history.

(56) References Cited

U.S. PATENT DOCUMENTS

| 3,181,815 A | * | 5/1965 | Paul | ........................ B64C 27/32 244/17.11 |
| 3,289,770 A | * | 12/1966 | Derschmidt | ............ B64C 27/39 416/102 |

(Continued)

FOREIGN PATENT DOCUMENTS

| EP | 3 421 358 | 1/2019 |
| GB | 1120193 | 7/1968 |
| WO | WO 2015/031768 | 3/2015 |

*Primary Examiner* — Christopher D Hutchens
(74) *Attorney, Agent, or Firm* — Leason Ellis LLP (57) ABSTRACT

A rotor for an aircraft is described that has a mast, an attenuating device to attenuate the transmission of vibrations from the mast in a plane orthogonal to the first axis, and a transmission device interposed between the mast and the attenuating device; the attenuating device comprises a first and a second mass unit with a first and a second mass rotatable about the first axis with a first and a second rotational speed, two control units operable to cause an additional rotation of at least one of the first and second masses, and a first and a second support assembly carrying the first and second masses; each control unit controls the angle between the first and second masses and comprises a set of drive gear teeth integral with the first support assembly, a cogwheel with a set of control gear teeth meshing with the drive gear teeth, and an actuator to cause the rotation of the cogwheel about a second axis and of the first mass about said first axis.

15 Claims, 5 Drawing Sheets

(56) References Cited

U.S. PATENT DOCUMENTS

| | | |
|---|---|---|
| 9,452,828 B2 | 9/2016 | Heverly et al. |
| 2011/0027081 A1* | 2/2011 | Jolly .................... F16F 15/223 |
| | | 416/31 |
| 2014/0360840 A1 | 12/2014 | Kirschbauer |
| 2015/0203196 A1* | 7/2015 | Heverly, II ........... B64C 27/001 |
| | | 701/3 |
| 2016/0325828 A1* | 11/2016 | Jolly .................... F16F 15/223 |
| 2017/0259911 A1 | 9/2017 | Choi |
| 2019/0263512 A1* | 8/2019 | Heverly ................. B06B 1/164 |
| 2020/0017203 A1* | 1/2020 | Stamps ................ B64C 27/001 |
| 2020/0156773 A1* | 5/2020 | Stamps ................... F16F 15/22 |
| 2020/0198779 A1* | 6/2020 | Colombo ................. F16H 1/06 |
| 2020/0207465 A1* | 7/2020 | Kopp ................... B64C 27/001 |
| 2020/0255132 A1* | 8/2020 | Stamps ................ H02K 41/031 |

\* cited by examiner

ROTOR FOR A HOVER-CAPABLE AIRCRAFT

CROSS-REFERENCE TO RELATED APPLICATIONS

This patent application is a U.S. National Phase Application under 35 U.S.C. § 371 of International Patent Application No. PCT/IB2020/056024, filed on Jun. 25, 2020, which claims priority from European patent application no. 19187420.5 filed on Jul. 19, 2019, the entire disclosure of which is incorporated herein by reference.

TECHNICAL FIELD

The present invention relates to a rotor for a hover-capable aircraft, in particular to a rotor for a helicopter.

BACKGROUND ART

Helicopters are known to basically comprise a fuselage, a main rotor positioned on the top of the fuselage and rotatable about an axis of its own, and a tail rotor located at the end of the fuselage.

In greater detail, the rotor, in turn, basically comprises a hub rotatable about the aforementioned axis and equipped with a plurality of blades radially fastened to and projecting from the aforesaid hub, and a mast that is connectable to a drive member and operatively connected to the hub to drive it in rotation.

In use, operation of the rotor causes the creation of high and low frequency vibrations. More specifically, low-frequency vibrations are generated by the wash separating from the blades and from the centre of the hub. This separation takes place at the centre of the hub and affects all the vertical and horizontal aerodynamic surfaces of the tail and the tail rotor.

In use, rotation of the blades at high angular speeds causes the generation of further high-frequency vibrations, which are transmitted to the mast and, in consequence, to the fuselage, deteriorating comfort for the occupants inside the fuselage.

More specifically, the vibratory loads act on both the hub and the mast, both axially and orthogonally to the mast's rotation axis.

Within the industry, it is known that in the rotating reference system, and thus integral with the rotor, hub and mast, the vibratory loads acting in the plane of the rotor have angular frequencies equal to $(N+1)*\Omega$, $(N-1)*\Omega$ and multiples thereof, where $\Omega$ is the rotation speed of the mast and N represents the number of blades of the rotor. It is also known that in passing from the rotating system to the fixed system of the fuselage, the vibratory loads acting in the plane of the rotor undergo a shift in frequency and have instead an angular frequency equal to $N*\Omega$ and associated multiples thereof on the fixed system.

From the foregoing, there is a clearly felt need within the industry for limiting transmission from the mast to the fuselage of vibrations having the aforementioned angular frequency equal to the product of the mast's rotation speed and the rotor's number of blades.

For this purpose, there are known passive attenuating devices and active attenuating devices.

Passive attenuating devices basically comprise masses elastically suspended from the mast or the hub. The vibration of these suspended masses enables to at least partially dissipate the vibrations on the mast and the hub.

Although they are simple to build and install and do not require energy sources outside the rotor, passive attenuating devices have maximum limits regarding the performances they can offer.

Active attenuating devices are fundamentally actuators that exert an attenuating force on the hub or on the mast, which counters the transmission of vibrations to the fuselage.

An example of these active attenuating devices is shown in Patent Application EP-A-3421358, in the name of the applicant.

This patent application illustrates the use of an attenuating device to attenuate the transmission of vibrations, for example flexural ones, i.e. in a plane orthogonal to the axis of the mast.

In greater detail, the attenuating device comprises:

a first and a second mass unit, each provided with a pair of masses eccentrically rotatable around the axis of the mast; and two control units, which are associated with respective mass units and are adapted to adjust the angle defined by the associated masses.

The masses are coupled to the rotation of the mast by a transmission device so that the masses of the first mass unit rotate eccentrically around the mast with a rotational speed with respect to the fixed system equal to $N*\Omega$ and in the same direction of rotation as the mast, and the masses of the second mass unit rotate with a rotational speed equal to $N*\Omega$ with respect to the fixed system and in the opposite direction of rotation to the mast.

In this way, the masses generate respective radial centrifugal forces with respect to the axis of the mast.

Referring to the first mass unit, the components of the centrifugal forces in the plane orthogonal to the axis of the mast vary sinusoidally with an angular frequency equal to $(N-1)*\Omega$ with respect to the rotor.

Conversely, referring to the second mass unit, the components of the second centrifugal forces in the aforementioned plane vary sinusoidally with an angular frequency equal to $(N+1)*\Omega$ with respect to the rotor.

The vector sum of the centrifugal forces generated by the masses of the first mass unit correspond to a first resultant attenuating force.

The vector sum of the centrifugal forces generated by the masses of the second mass unit correspond to a second resultant attenuating force.

Each control unit is operable to selectively adjust the angle between the position(s) of the respective masses of the respective first or second mass unit with respect to fixed direction, so as to adjust the magnitude and phase with respect to a fixed direction of the respective first and second resultant attenuating forces.

For each mass of the associated first or second mass units, each control unit also comprises:

an electric motor;

a worm screw operatively coupled to the respective electric motor and rotatable about a respective axis; and a cogwheel coupled to the worm screw and operatively connected to the respective mass.

The operation of each electric motor causes, through the coupling between the associated worm screw and cogwheel, additional rotation of the masses of the first and second mass units with respect to the transmission device.

In this way, it is possible to adjust the magnitude and phase with respect to a fixed direction of the first and second resultants.

Due to the high reduction ratio existing between the worm screw and the associated cogwheel, the coupling between the worm screw and associated cogwheel require the electric motor to rapidly produce high torque values.

Furthermore, due to the irreversibility of the coupling between worm screw and associated cogwheel, the attenuating devices of a known type are able to cause additional rotation of the masses in only one direction.

In consequence, the attenuating devices of a known type are susceptible to improvements with regard to flexibility and responsiveness in the generation of the first and second resultant attenuating forces, especially when the magnitude and direction of the vibrations to be attenuated change quickly.

In the event of the failure of the electric motor, the irreversibility of the coupling between worm screw and cogwheel also causes the locking of the attenuating device.

Furthermore, the attenuating device described in the above-mentioned patent application EP-A-3421358 has significant axial bulk.

Therefore, there is awareness in the industry of the need to make the attenuation of vibrations transmitted to the fuselage as precise and rapid as possible.

There is also awareness in the industry of the need to attenuate vibrations in the plane of the rotor, preserving the effectiveness of the aforementioned active attenuating devices and reducing, as far as possible, the weight, bulk and overall costs.

Finally, there is awareness in the industry of the need to limit as far as possible the stresses acting on the transmission device in the plane orthogonal to the mast's rotation axis, in particular on the shafts, gears and bearings of the transmission device.

GB 1120193, US 2014/360840, WO2015031768 and WO2015031768 describe attenuating devices of known type using the action of centrifugal forces of masses rotatable eccentrically with respect to the mast's rotation axis.

U.S. Pat. No. 9,452,828 discloses a vibration attenuator for an aircraft with at least one weight mounted in a rotating system of a rotor hub of the aircraft. Each weight is rotatable about an axis of rotation of the hub relative to the hub and to each other weight. Drive means are provided for rotating each weight about the axis of rotation at a selected speed for creating oscillatory shear forces that oppose and attenuate rotor-induced vibrations having a selected frequency. A vertically oriented vibration attenuator is configured to oppose and attenuate vertical rotor induced oscillatory forces that would otherwise travel vertical down the rotor mast and into the airframe. A vibration attenuator having weights rotating about separate axes offset from each other.

DISCLOSURE OF INVENTION

The object of the present invention is to produce a rotor for a hover-capable aircraft that enables satisfying at least one of the above-specified needs in a simple and inexpensive manner.

The aforesaid object is achieved by the present invention, in so far as it relates to a rotor for a hover-capable aircraft as defined in claim 1.

BRIEF DESCRIPTION OF THE DRAWINGS

For a better understanding of the present invention, two preferred embodiments are described hereinafter, purely by way of a non-limitative example and with reference to the accompanying drawings, in which.

BEST MODE FOR CARRYING OUT THE INVENTION

Figure 1:
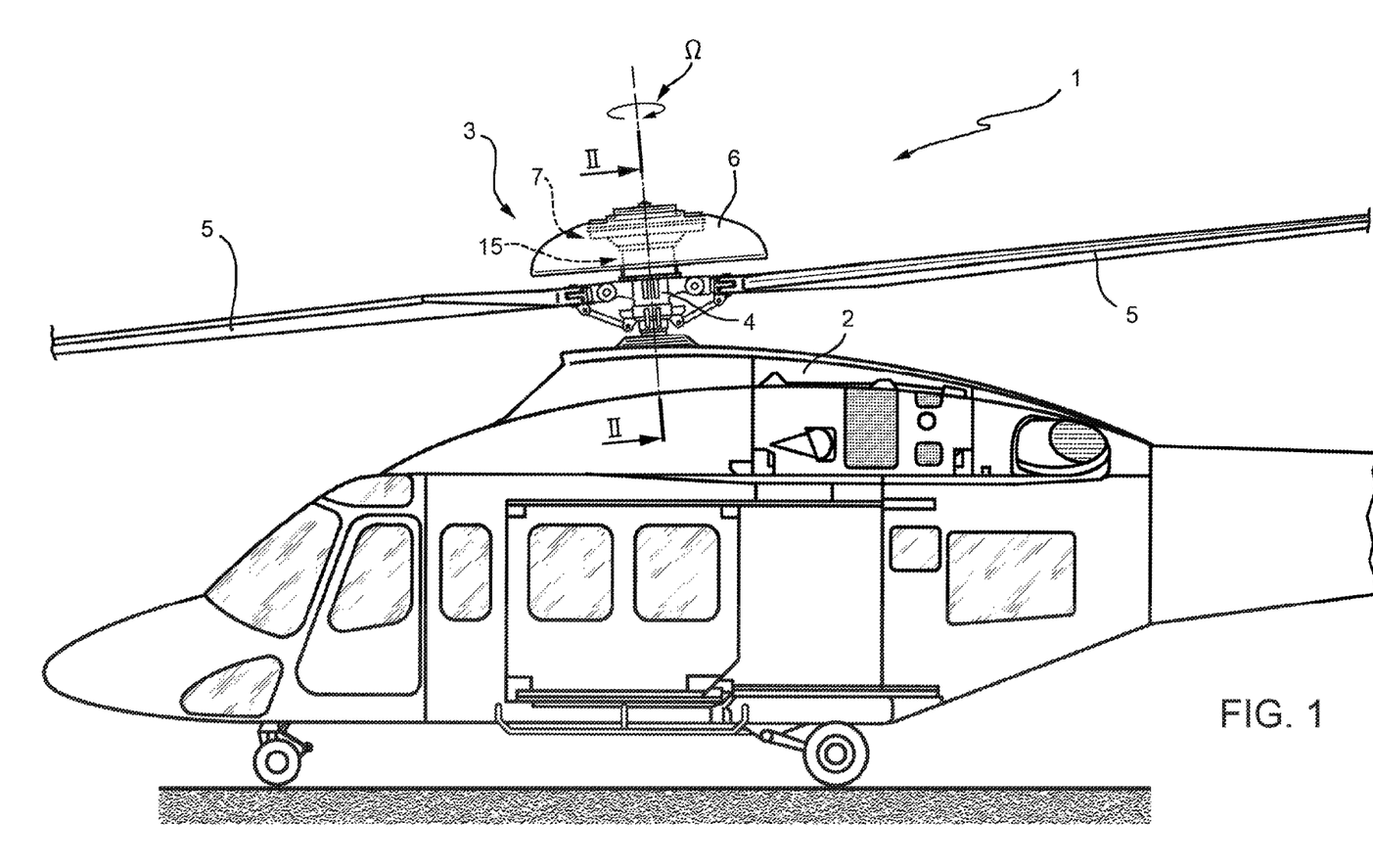
FIG. 1 is a side view of a helicopter comprising a rotor according to the present invention, with parts removed for the sake of clarity.

Referring to FIG. 1, reference numeral 1 indicates a hover-capable aircraft, in particular a helicopter.

The helicopter 1, in turn, comprises:
- a fuselage 2;
- a main rotor 3 positioned on the top of the fuselage 2 and rotatable about an axis A; and
- a tail rotor (not shown and in itself known) arranged at one end of the fuselage 2 and rotatable about its own axis, transversal to axis A.

In greater detail, the rotor 3 comprises a hollow hub 4, with axis A, carrying in a cantilever fashion a plurality of blades 5, which extend radially to axis A.

The rotor 3 also comprises a mast 50 (FIG. 2) rotatable about axis A with angular speed $\Omega$ with respect to a reference system integral with the fuselage 2. The mast 50 is coupled in an angularly integral manner to the hub 4 and is connected, in a manner not shown, to a drive unit, for example a turbine, of the helicopter 1. In particular, the hub 4 is driven in rotation about axis A by the mast 50.

In the case shown, the mast 50 is partly housed inside the hub 4.

Preferably, the mast 50 is hollow.

With particular reference to FIG. 1, the rotor 3 also comprises a flow conveyor 6 adapted to guide the airflow generated by the rotation of the rotor 3 according to a predetermined path shaped so as to limit the vibrations generated by separation of the aforesaid flow from the tips of the blades 5 arranged on the opposite end to the hub 4.

In particular, the flow conveyor 6 is annular, extends around axis A and is arranged on the opposite side of the hub 4 with respect to the fuselage 2.

Preferably, the flow conveyor 6 has a "cap-like" shape and is delimited by a pair of surfaces axially facing each other.

Preferably, the walls of the flow conveyor 6 are shaped so that their axial distance decreases proceeding in a radial direction starting from axis A.

The rotor 3 further comprises a vibration-attenuating device 7 configured to attenuate the transmission of vibrations to the mast, especially in a plane orthogonal to axis A. In other words, the attenuating device 7 is configured to attenuate the transmission of vibrations in the plane of the rotor disc that are transmitted to the fuselage 2.

The attenuating device 7 comprises a mass unit 8 and a mass unit 9, which are rotatable about axis A with a first and a second angular speed, respectively.

The mass units 8 and 9 are indirectly coupled to the mast 50.

Each mass unit 8 and 9 comprises a respective mass 10 and a respective mass 11 arranged eccentrically with respect to axis A and eccentrically rotatable about axis A.

The masses 10, 11 of mass unit 8 are coupled to the hub 4 and to the mast 50 so as to be rotatable about axis A with respect to the mast 50 in the same direction of rotation of the mast about axis A and with angular speed equal to $(N-1)*\Omega$ relative to the mast 50, where N is the number of blades 5 and $\Omega$ is the angular rotation speed of the mast 50.

In the present description, the term angular frequency means the frequency multiplied by 2n.

In a similar manner, the masses 10, 11 of mass unit 9 are coupled to the hub 4 and to the mast 50 so as to be rotatable about axis A and with respect to the mast 50 in the opposite direction of rotation to the mast 50 about axis A and with angular speed equal to $(N+1)*\Omega$ relative to the mast 50.

Where not expressly indicated, hereinafter in the present description it is understood that the angular speeds $(N-1)*\Omega$ and $(N+1)*\Omega$ are to be considered in the reference system integral with the mast 50.

As a result of their rotation about axis A, the masses 10, 11 of each mass unit 8, 9 generate respective centrifugal forces directed radially to axis A and lying on a plane orthogonal to axis A.

Each of these centrifugal forces has respective components in the aforementioned plane orthogonal to axis A having a sinusoidal course with an angular frequency corresponding to the angular speeds $(N-1)*\Omega$, $(N+1)*\Omega$ of the respective masses 10, 11 about axis A.

The vector sum of the centrifugal forces generated by the masses 10, 11 of mass unit 8 correspond to a first resultant attenuating force. The components of this first resultant force in the plane orthogonal to axis A have angular frequency $(N-1)*\Omega$.

In this way, and considering the passage from the rotary system of the rotor 3 to the fixed system of the fuselage 2, the aforesaid components of the first resultant attenuating force are sinusoidal with angular frequency $N*\Omega$, with respect to the reference system integral with the fuselage 2.

The vector sum of the centrifugal forces generated by the masses 10, 11 of mass unit 9 correspond to a second resultant attenuating force. The components of this second resultant force in the plane orthogonal to axis A have angular frequency $(N+1)*\Omega$.

In this way, and considering the passage from the rotary system of the rotor 3 to the fixed system of the fuselage 2, the aforesaid components of the second resultant attenuating force are sinusoidal with angular frequency $N*\Omega$ with respect to the reference system integral with the fuselage 2.

In particular, these first and second resultant attenuating forces have magnitudes dependent on the weights of the respective masses 10, 11, on the angle defined by the masses 10, 11, and on the respective rotational speeds about axis A.

In fact, when, for example, the angle between the masses 10, 11 is minimal, the first (second) resultant attenuating force has maximum magnitude. Conversely, when this angle is one hundred and eighty degrees, the first (second) resultant attenuating force has zero magnitude.

In other words, by varying the relative angle between the masses 10, 11 of each mass unit 8 (9), it is possible to adjust the magnitude of the first (second) resultant force.

By integrally varying the position of the masses 10 and 11 of each mass unit 8 (9) with respect to the fixed direction, it is instead possible to adjust the phase angle defined between the first (second) resultant and a fixed direction in the plane orthogonal to axis A.

Hereinafter in this description, the term "angle between the masses 10 and 11" means the angular distance between segments radial to axis A and joining axis A and the barycentres of the respective masses 10, 11.

In the case shown, the masses 10, 11 of each mass unit 8 and 9 are equal to each other and are arranged at the same distance from axis A.

In the case shown, the masses 10 and 11 of the mass unit 8 are equal to the masses 10 and 11 of the unit 9.

In consequence, the centrifugal forces generated by the masses 10, 11 of mass units 8 (9) are equal to one another in magnitude.

Figure 2:
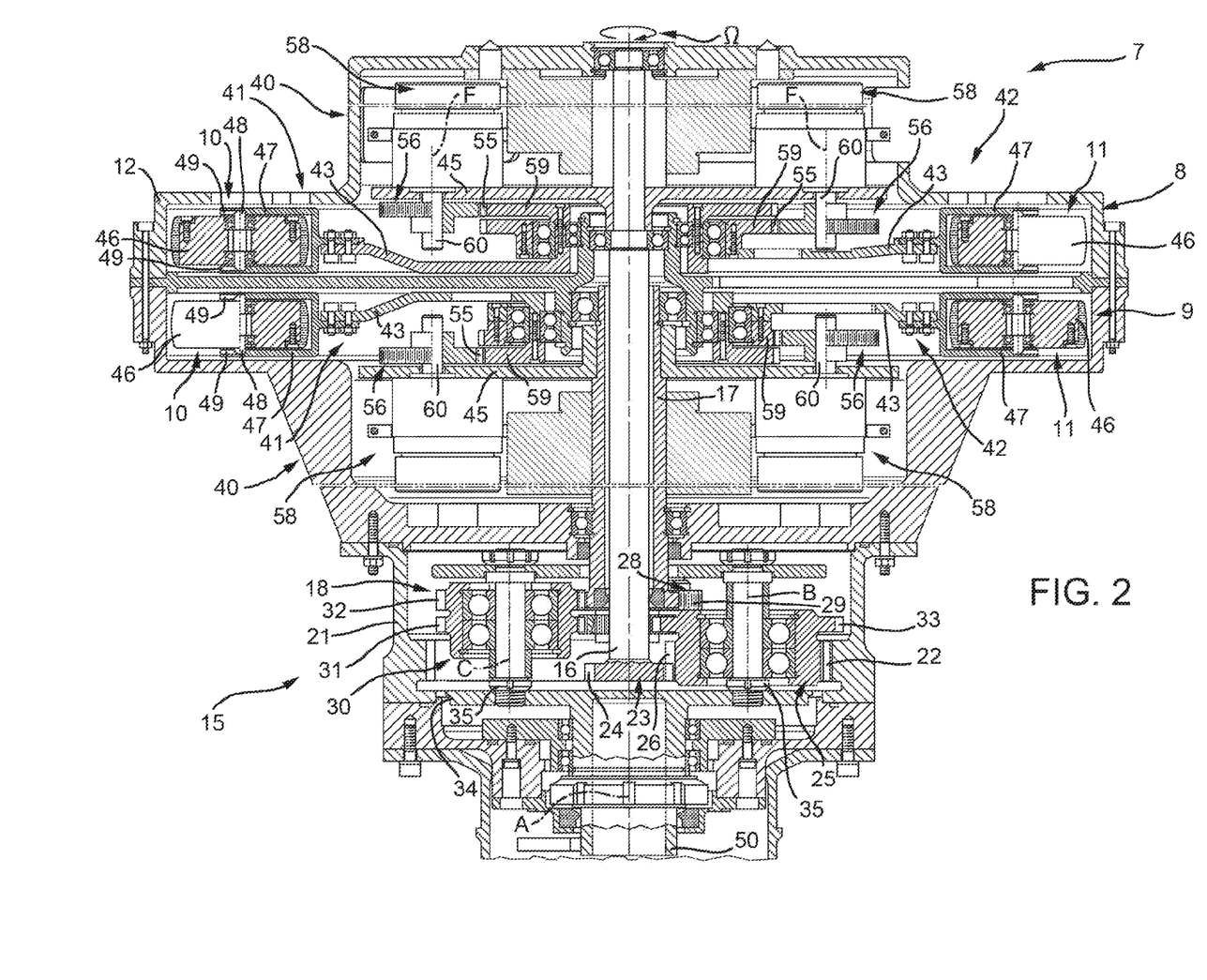
FIG. 2 shows, in section along line II-II of FIG. 1, a first embodiment of an attenuating device incorporated in the rotor of FIG. 1, with parts removed for the sake of clarity.

With particular reference to FIG. 2, the rotor 3 also comprises a transmission unit 15 configured to transfer rotation of the mast 50 about axis A to the attenuating device 7. In particular, the transmission unit 15 Is functionally interposed between the mast 50 and the mass units 8 and 9, and is configured to drive the respective masses 10 and 11 in eccentric rotation about axis A with angular speeds $(N-1)*\Omega$ and $(N+1)*\Omega$, respectively, with respect to the mast 50 and with respective directions of rotation opposite to each other.

In particular, the transmission unit 15 is functionally connected to the mast 50 and to the masses 10, 11 of mass units 8, 9.

Mass unit 8 is axially spaced from mass unit 9. In particular, mass unit 8 is positioned above mass unit 9, or rather mass unit 9 is interposed between mass unit 8 and the transmission unit 15 and/or the hub 4.

Furthermore, the attenuating device 7 comprises a shell 12, in which the mass units 8 and 9 and a part of the transmission unit 15 are housed.

Preferably, the shell 12 is interposed between the hub 4 and the flow conveyor 6. In particular, the flow conveyor 6 at least partially covers the shell 12.

In greater detail, the transmission unit 15 comprises (FIG. 2):
- an auxiliary shaft 16 angularly connected to mass unit 8, in particular to the respective masses 10 and 11, and rotatable about axis A;
- an auxiliary shaft 17 angularly connected to mass unit 9, in particular to the respective masses 10 and 11, and rotatable about axis A; and
- a transformation unit 18 functionally coupled to the mast 50 and to the auxiliary shafts 16 and 17, and configured to receive motion from the rotatable mast 50 with angular speed $\Omega$ and transfer the motion to the auxiliary shafts 16 and 17.

In this way, auxiliary shaft 16 and auxiliary shaft 17 respectively rotate about axis A with rotation speed $(N-1)*\Omega$ in the same direction as the direction of rotation of the mast 50 and with rotation speed $(N+1)*\Omega$ in the opposite direction to the direction of rotation of the mast 50.

More specifically, the transformation unit 18 comprises a first epicyclic train functionally interposed between the mast 50 and the auxiliary shaft 16, and a second epicyclic train functionally interposed between the mast 50 and auxiliary shaft 17.

In particular, the first and second epicyclic trains are also operatively coupled to the mast 50.

In the case shown, the second epicyclic train comprises, as will be described in greater detail further on, portions of the first epicyclic train. In this way, it is possible to obtain a transmission unit 15, in particular a compact transformation unit 18.

Preferably, and with particular reference to FIG. 2, the transformation unit 18 comprises:
- a tubular casing 21 provided with gear teeth 22 radially internal with respect to axis A;
- a sun gear 23, rotatable about axis A, having gear teeth 24 radially external with respect to axis A and angularly integral with auxiliary shaft 16; and
- a plurality of planet gears 25 (only one of which is shown in FIG. 2) rotatable about respective rotation axes B and each having respective first gear teeth 26 radially external with respect to the respective axis B.

In the case shown, the B-axes are parallel to and offset from axis A.

In particular, each first gear teeth 26 mesh with gear teeth 22 and with gear teeth 24.

In particular, the planet gears 25 are operatively and indirectly coupled to the mast 50 to be driven in rotation about axis A. Furthermore, the planet gears 25 rotate about respective axes B, due to the interaction between the respective gear teeth 26 and gear teeth 22. This rotation is then transferred to the auxiliary shaft 16 by the meshing between gear teeth 26 and gear teeth 24.

In particular, the first epicyclic train comprises the casing 21, the sun gear 23 and the planet gears 25 and the inner gear teeth 22, gear teeth 24 and gear teeth 26.

Preferably, and with particular reference to FIG. 2, the transformation unit 18 also comprises:
- a sun gear 28 rotatable about axis A having gear teeth 29 radially external with respect to axis A and angularly integral with the auxiliary shaft 17; and
- a plurality of planet gears 30 (only one of which is shown in FIG. 2) rotatable about respective axes of rotation C (parallel to axis A), and each having respective first gear teeth 31 and respective second gear teeth 32 radially external with respect to the respective axis C.

In particular, each planet gear 25 further comprises second gear teeth 33 radially external with respect to the respective axis B.

In particular, each first set of gear teeth 31 meshes with at least one respective second set of gear teeth 33, and each second set of gear teeth 32 meshes with gear teeth 29. Due to this configuration, each planet gear 30 is driven in rotation by the rotation of a respective planet gear 25, which, in turn, is rotatable with respect to the casing 21.

In the case shown, the C-axes are parallel to and offset from axis A.

In particular, the second epicyclic train comprises the casing 21, at least a portion of planet gears 25, planet gears 30 and sun gear 28, inner gear teeth 22 and gear teeth 26, 31, 32 and 33.

The gear teeth 22, 24, 26, 31, 32 and 33 are sized so as obtain a rotational speed of $(N+1)*\Omega$ for auxiliary shaft 17 and a rotational speed of $(N-1)*\Omega$ for auxiliary shaft 16.

The transmission unit 15, in particular the transformation unit 18, further comprises a planet-gear carrier to support the planet gears 25 and 30 in a rotatable manner about the respective axes B and C. In particular, the planet-gear carrier is rotatable about axis A and is angularly integral with the mast 50. In particular, due to the connection of the planet-gear carrier to the mast 50, rotation of the planet-gear carrier about axis A is obtained when the mast 50 rotates about axis A.

Preferably, the planet-gear carrier comprises a support base 34 orthogonal to axes A, B, C, and a plurality of rotating shafts 35 parallel to the respective axes B and C. The rotating shafts 35 are fixed to and project in a cantilever fashion from the support base 34.

Preferably, the support base 34 is operatively connected to the mast 50 so that, in use, it can be driven in rotation about axis A.

Preferably, the casing 21 is fixed to the shell 12.

Figure 3:
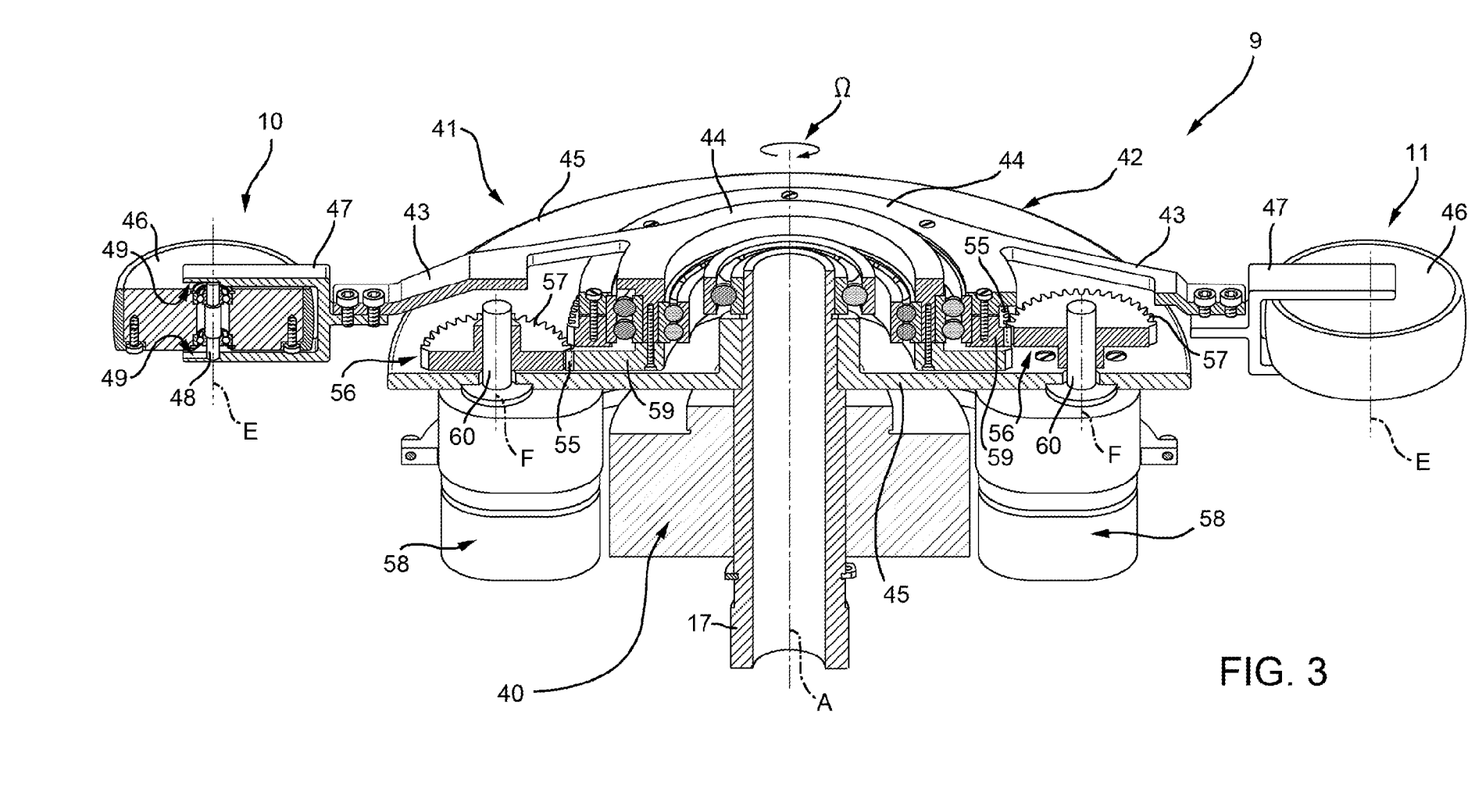
FIG. 3 shows, in a partially sectioned view, some details of the attenuating device of FIG. 2, with parts removed for the sake of clarity.

With particular reference to FIGS. 2 and 3, the attenuating device 7 also comprises two control units 40, one operatively connected to mass unit 8 and the other to mass unit 9.

More specifically, each control unit 40 can be operated to cause additional rotation about axis A of the masses 10, 11 of the respective mass unit 8, 9 relative to the corresponding auxiliary shaft 16, 17.

This rotation enables selective adjustment of the angle between the masses 10, 11 of the respective mass unit 8, 9 and the position of the masses 10, 11 with respect to the fixed direction rotating integrally with the respective auxiliary shafts 16, 17, simultaneously with the rotation of the mass units 8, 9 about axis A with the respective first and second angular speeds $((N-1)*\Omega$ and $(N+1)*\Omega)$.

In this way, each control unit 40 enables selective control of the magnitude and respective phase of the respective first or second resultant attenuating force generated by the associated mass unit 8, 9. It is thus possible to attenuate the vibrations originating from the blades 5 and transmitted from the mast 50 to the fuselage with the first and second resultant attenuating force each having the desired magnitude and direction.

Each mass unit 8 and 9 comprises a respective support assembly carrying the respective mass 10 and a respective support assembly 42 carrying the respective mass 11 (FIGS. 2 and 3).

In greater detail, each support assembly 41 and 42 is coupled to the transmission unit 15 so as to be driven in rotation about axis A with the respective first and second angular speeds $(N-1)*\Omega$ and $(N+1)*\Omega$.

In particular, each support assembly 41, 42 is also selectively operable by the respective control unit 40 to additionally rotate with respect to the respective auxiliary shafts 16, 17 and so selectively adjust the angle between the masses 10, 11 of the respective mass units 8, 9 and the position of the aforesaid masses 10, 11 with respect to the fixed direction.

Each support assembly 41 and 42 further comprises (FIG. 3):
- a respective annular support 44; and
- an arm 43 projecting in a cantilever fashion, radially from axis A, and carrying a respective mass 10 and 11.

In the case shown, each support assembly 41 and 42 extends coaxially to the respective auxiliary shaft 16 or 17, and therefore coaxially to axis A.

In particular, each annular support 44 is rotatable about the respective auxiliary shaft 16 or 17 and coupled to the respective control unit 40 to enable adjustment of the relative angle between the respective masses 10 and 11.

Each mass unit 8 and 9 also comprises a respective base support rotatable about axis A and operatively connected to the transmission unit 15 to be driven in rotation about axis A at the first and second rotational speeds $(N-1)*\Omega$, $(N+1)*\Omega$, respectively. In particular, the base support 45 of the mass units 8 and 9 is integral with and connected to the respective auxiliary shaft 16 or 17.

Each support assembly 41 and 42 is connected in a rotatable manner to the respective support base 45.

In this way, the motion is transferred from the respective auxiliary shaft 16 and 17 to the respective support assembly 41 and 42 and to the respective masses 10 and 11, respectively.

In particular, each support assembly 41 and 42 is arranged axially on a first side of the base support 45 in a direction parallel to axis A.

Preferably, each base support 45 is made in the form of a circular plate.

Each mass 10 and 11 also comprises a respective wheel 46 rotatable about a respective rotation axis E.

Preferably, each mass 10 and 11 is coupled to the respective support assembly 41 or 42, in particular to the respective arm 43, in a radially movable manner with respect to axis A. In this way, each mass 10, 11 is pushed against a radially inner wall of the shell 12 by the centrifugal force.

Due to this contact and to the rotation of the masses 10 and 11 about axis A, each wheel 46 rotates about the respective axis E.

Furthermore, due to this contact between the wheels 46 and the inner wall of the shell 12, the respective centrifugal forces are transmitted to the mast 50 in an efficient manner, due to the support system of the mast 50 with respect to the shell 12.

Alternatively, each mass 10 and 11 could comprise more than one wheel 46 rotatable about a respective rotation axis E.

Mass 10 and the respective mass 11 of each mass unit 8 and 9 lie on the same plane orthogonal to axis A. In consequence, the sizes of the wheels 46 define a minimum angle between the respective masses 10 and 11, at which the masses 10, 11 are in contact with each other.

Each mass 10, 11 of the mass units 8, 9 also comprises a coupling element 47 carrying the respective wheel 46 and coupled to the respective arm 43.

Each mass 10, 11 also comprises a pin 48 parallel to axis A, which couples the respective wheel 46 to the respective coupling element 47 in a rotatable manner and which defines the respective axis E.

In particular, the respective wheel 46 is rotatable about the respective pin 48, about the associated axis E.

Each pin 48 is coupled to the respective coupling element 47 in a radially movable manner to enable the radial movement of the respective wheel 46.

In particular, each coupling element 47 comprises two radially extending guide grooves 49 parallel to each other, in which the respective ends of the respective pin 48 are housed. In particular, each end is slidable in the respective guide groove to enable radial movement of the respective pin 48, and consequently of the respective wheel 46, under the action of the centrifugal force.

Alternatively, or in addition, each coupling element 47 is coupled in a radially movable manner to the respective arm 43.

Advantageously, each control unit 40 comprises (FIG. 3):
two sets of drive gear teeth 55, one integral with the respective support assembly 41 and the other integral with the respective support assembly 42;
two cogwheels 56, each provided with respective control gear teeth 57 meshing with a respective set of drive gear teeth 55 and rotatable about their own axis F, parallel to and staggered with respect to axis A; and
two actuators 58, in particular two electric motors, each connected to a respective cogwheel 56 and operable to cause rotation of the respective cogwheel 56 about the respective axis F and the consequent rotation of the respective support assembly 41 or 42 about axis A.

In particular, each drive gear teeth 55 and each set of control gear teeth 57 are made of a self-lubricating material and/or polymer material.

Each control unit 40 also comprises two annular elements 59, one connected to respective support assembly 41 and the other connected to respective support assembly 42. In particular, each annular element 59 carries the respective drive gear teeth 55 on its circumferential edge.

Preferably, each annular element 59 and the respective drive gear teeth 55 are made in a single piece and/or of the same material.

According to the embodiment shown in FIG. 3, each annular element 59 is fastened to the respective annular support 44. In particular, each annular element 59 is interposed between at least the respective annular support 44 and the respective base support 45.

Preferably, each of the annular elements 59 that is connected to the respective support assembly 41 is interposed between the support base 34 and the respective annular element 59 that is connected to the respective support assembly 42.

According to the embodiment shown in FIG. 3, each set of drive gear teeth 55 is arranged radially external to the axis A.

Furthermore, each set of drive gear teeth 55 is arranged radially internal relative to the respective cogwheel 56 and with reference to axis A.

Furthermore, the sets of drive gear teeth 55 are axially superimposed on each other and arranged at the same radial distance from axis A.

Each actuator 58 also comprises an output shaft 60 rotatable about the axis A and on which the respective cogwheel 56 is fitted.

Each actuator 58 is configured to cause a selective rotation of the respective cogwheel 56 and respective output shaft 60 in both possible directions.

Each actuator 58 is also fastened to the respective base support 45, in particular at a second side of the respective base support 45, opposite to the respective first side in a direction parallel to axis A.

Preferably, the masses 10, 11 are axially interposed along axis A between the actuators 58 of mass unit 8 and the actuators 58 of mass unit 9 (FIG. 2).

Furthermore, the actuators 58 of mass units 8, 9 are radially interposed between the masses 10, 11.

In this way, it is possible to reduce the axial dimensions of the shell 12.

The rotor 3 also comprises a first slip-ring and a second slip-ring (not shown) to electrically connect a source of electrical power carried by the fuselage 2 with respective actuators 58.

The rotor 3 also comprises (FIG. 6):
a plurality of sensors 100 configured to generate a plurality of signals associated with the state of acceleration of the fuselage 2 in a plane orthogonal to axis A; and
a control unit 101 configured to generate, on the basis of the signals generated by the aforesaid sensors, a control signal for the actuators 58 of the control units 40.

In use, the mast 50 drives the hub 4 and the blades 5 in rotation about axis A.

More specifically, the mast 50 rotates about axis A with angular speed $\Omega$ in the reference system integral with the fuselage 2.

The rotation of the hub 4 and of the blades 5 generates vibrations, which tend to be transmitted to the mast 50 and, from there, to the fuselage 2.

With respect to the fixed system of the fuselage 2, these vibrations mainly have an angular frequency equal to $N*\Omega$, where N is the number of blades 5 and $\Omega$ is the angular rotation speed of the mast 50.

In order to reduce these vibrations, the mast 50 drives, via the transmission unit 15, the masses 10 and 11 of the respective mass units 8 and 9 in eccentric rotation about axis A with the respective angular speeds $(N-1)*\Omega$ and $(N+1)*\Omega$ and with respective directions in the same and in the opposite direction with respect to the direction of rotation of the mast 50.

These rotations of the masses 10 and 11 of the mass units 8, 9 cause the generation of respective centrifugal forces acting on the mast 50.

More specifically, the centrifugal forces generated by the masses 10 and 11 of mass unit 8 (9) have components in the plane orthogonal to axis A with a sinusoidal course and respective angular frequencies equal to $(N-1)*\Omega$, $(N+1)*\Omega$, in the reference system integral with the mast 50.

The first (second) resultant attenuating force generated by the masses 10 and 11 of mass unit 8 is equal to the vector sum of the first (second) centrifugal forces.

The first and second resultant attenuating forces attenuate the transmission of vibrations to the fuselage 2 in a plane orthogonal to axis A.

Furthermore, these first and second resultant attenuating forces have, in the reference system integral with the fuselage 2, an angular frequency equal to $N*\Omega$, i.e. to the angular frequency of the disturbing vibratory forces that it is wished to attenuate.

Furthermore, these first and second resultant attenuating forces have magnitudes dependent on the angles between the respective masses 10 and 11 of the respective mass unit 8 and 9. For example, the magnitude of these first and second resultant forces is maximum when the angle defined between the associated masses 10 and 11 is minimum.

Conversely, the magnitude of these first and second resultant attenuating forces is minimum and equal to zero when the angle between the associated masses 10 and 11 is one hundred and eighty degrees.

Instead, the phases of the first and second resultant attenuating forces with respect to the fixed direction depend on the angular position of the masses 10 and 11 with respect to the fixed direction.

It is important to note that the masses 10 and 11 exert the respective first and second resultants on the mast 50 and rotate with respective angular speeds $(N-1)*\Omega$, $(N+1)*\Omega$, both when the control units 40, in particular the actuators 58, are activated and when they are deactivated.

Whereas the selective activation of the control units 40, in particular of actuators 58, enables varying the magnitude and phase of the first and second resultant forces on the mast 50, so as to adjust the magnitude and phase of the first and second resultant attenuating forces.

The functioning of the rotor 3 is hereinafter described starting from a state in which the control units 40, in particular the actuators 58, are deactivated.

In this condition, the relative angles between the respective masses 10 and 11 are fixed.

The mast 50 drives the aforesaid auxiliary shafts 16 and 17 of the transmission unit 15 in rotation about axis A.

The first and second epicyclic trains are configured so that the aforesaid auxiliary shafts 16 and 17 rotate about axis A with the respective angular speeds $(N-1)*\Omega$ and $(N+1)*\Omega$, in the reference system integral with the mast 50.

In particular, the mast 50 and the first auxiliary shaft 16 rotate in the same direction and the second auxiliary shaft 17 rotates in the opposite direction to the mast 50 and auxiliary shaft 16.

The first and second auxiliary shafts 16 and 17 respectively drive the mass units 8 and 9, in particular the respective masses 10 and 11, in rotation about axis A with the respective angular speeds $(N-1)*\Omega$ and $(N+1)*\Omega$.

In addition, during rotation about axis A, the masses 10 and 11 are pushed by the centrifugal forces against the inner wall of the shell 12, so as to transfer the first and second resultant attenuating forces to the mast 50.

In the condition where the control units 40 are deactivated, the actuators 58 are deactivated and, therefore the respective support assemblies 41 and 42 do not change the respective angles defined between them. In addition, the support assemblies 41 and 42 do not change the respective angular positions with respect to the fixed direction rotating integrally with the associated auxiliary shaft 16, 17.

In consequence, in the aforementioned condition, the support assemblies 41 and 42, although mounted in an angularly movable manner with respect to the respective first and second auxiliary shafts 16, 17, are driven in rotation by the respective auxiliary shaft 16, 17 with the respective angular speeds $(N-1)*\Omega$ and $(N+1)*\Omega$.

In consequence, rotation of the support assemblies 41 and 42 causes the eccentric rotation of the associated masses 10 and 11 about axis A with the respective angular speeds $(N-1)*\Omega$ and $(N+1)*\Omega$.

The functioning of the rotor 3 is hereinafter described with reference to a state of activation of the control units 40, in particular of actuators 58.

Figure 6:
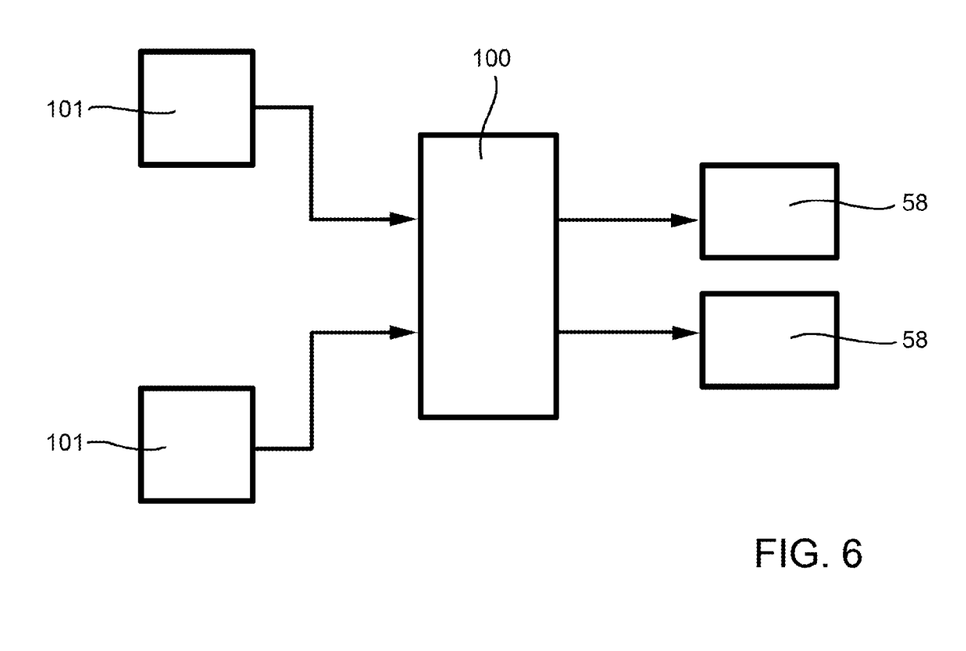
FIG. 6 shows a schematic view of some components of the attenuating device of FIGS. 2 to 5.

Referring to FIG. 6, the control unit 101 receives signals associated with the state of acceleration of the mast 50 from the sensors 100 and generates control signals for the actuators 58 of the control units 40, in the event of detecting the need to vary the phases and amplitudes of the first and second resultant attenuating forces.

The activation of one or more actuators 58 causes rotation of the respective support assemblies 41 and 42 about axis A to position the masses 10 and 11 so that they define the desired respective angles between one another and in the desired angular positions with respect to the fixed direction rotating integrally with the associated auxiliary shaft 16 or 17.

More specifically, and with reference to mass unit 8 (9), the operation of one of the actuators 58 causes the rotation of the respective output shaft 60 and cogwheel 56 about the associated axis F.

The rotation of the associated cogwheel 56 causes, through the meshing of the respective control gear teeth 57 and drive gear teeth 55, the additional rotation of the associated support assembly 41 (42) by a predetermined angle about axis A.

In consequence, also the mass 10 (11) additionally rotates by the predetermined angle about the axis A with respect to the other mass 11 (10) and to the auxiliary shafts 16 and 17.

The associated angle between the masses 10, 11 of the mass unit 8 (9) is thus altered and, therefore, the amplitude of the first (second) resultant attenuating force is adjusted.

The position of the masses 10, 11 of the mass unit 8 (9) with respect to the fixed direction is also integrally altered and, therefore, the phase of the first (second) resultant attenuating force is altered with respect to that fixed direction.

Figures 4, 5:
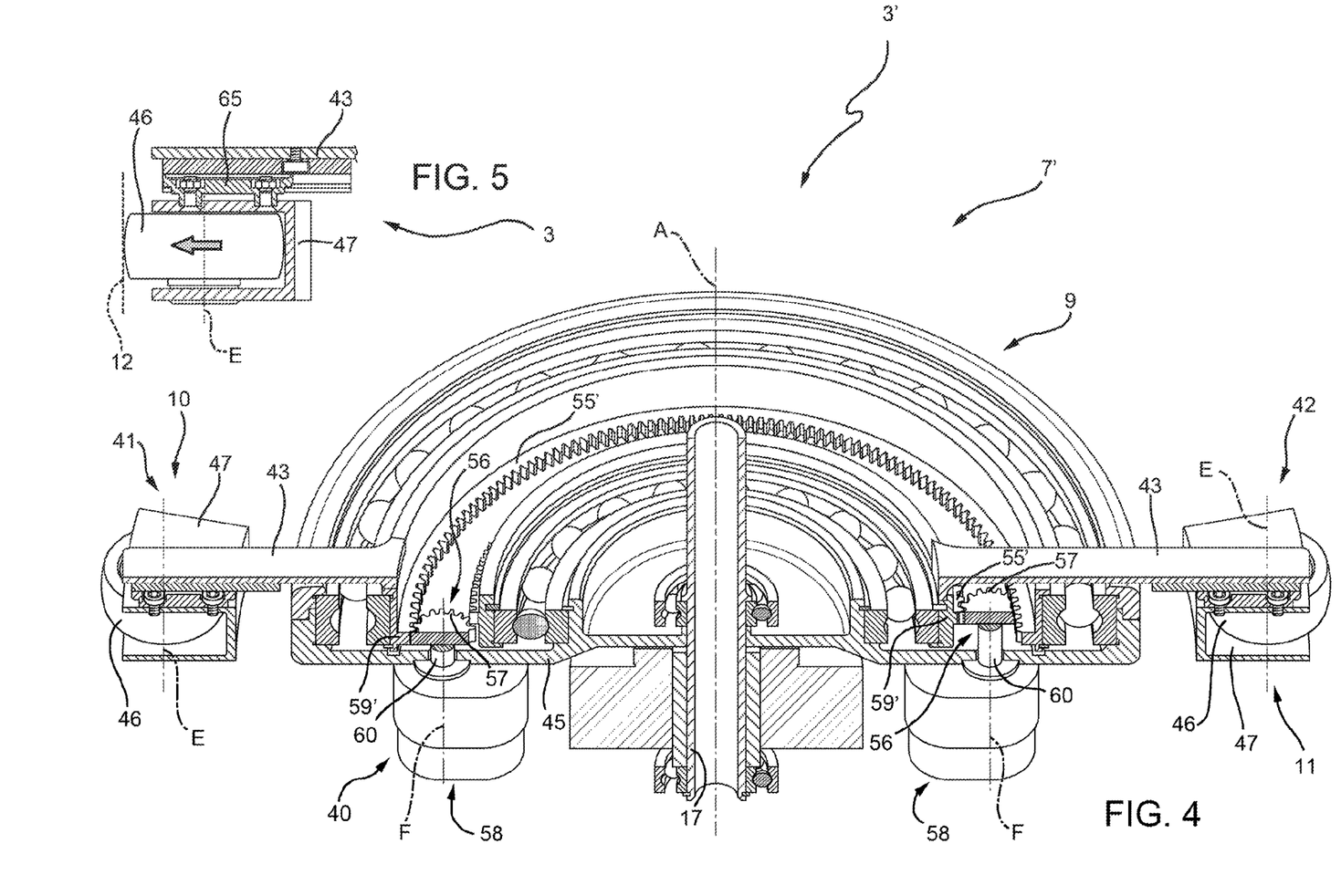
FIG. 4 shows, in a partially sectioned view, some details of a second embodiment of the attenuating device of FIG. 2, with parts removed for the sake of clarity.
FIG. 5 shows, in a partially sectioned view, some details of the attenuating device of FIG. 4, with parts removed for the sake of clarity.

With particular reference to FIG. 4, reference numeral 7' indicates an attenuating device (only partially shown) for a rotor 3' according to a second embodiment of the present invention.

Attenuating device 7' is similar to attenuating device 7 and will hereinafter be described only with regard to what differentiates it from the latter; the same or equivalent parts of attenuating devices 7 and 7' will be indicated, where possible, by the same reference numbers.

In particular, each attenuating device 7' differs from attenuating device 7 due to the fact that the drive gear teeth 55' of each control unit 40 are radially and axially spaced from each other. In particular, one of the respective sets of drive gear teeth 55' is arranged radially internal and the other is arranged radially external with respect to axis A.

Furthermore, one of the annular elements 59' of each control unit 40 has an inner diameter larger than the outer diameter of the other annular element 59'. In particular, the respective annular element 59' with the larger internal diameter is provided with the drive gear teeth 55' that are arranged radially internal with respect to axis A and the other annular element 59' has the drive gear teeth 55' that are arranged externally.

Preferably, the annular element 59' with the larger internal diameter of each control unit 40 surrounds the other annular element 59' of the same control unit 40.

Attenuating device 7' also differs from attenuating device 7 in that the arms 43 are directly connected to the respective annular elements 59'.

Alternatively, each arm 43 could be mounted on a respective annular support, which is carried by the respective annular element 59'.

In particular, attenuating device 7' also differs from attenuating device 7 due to the fact that each support assembly 41 and 42 comprises a respective slide 65' (see FIG. 5 in particular) adapted to couple the respective coupling element 47 to the respective arm 43 in a radially movable manner. In particular, each slide 65' carries the respective coupling element 47 and is connected to the respective arm 43 in radially movable manner.

The operation of the rotor 3' comprising the actuating device 7' is similar to the operation of rotor 3 with actuating device 7 and is therefore not described in detail.

From examination of the characteristics of the rotor 3, 3' according to the present invention, the advantages that can be achieved therewith are evident.

In particular, the rotor 3 or 3' is equipped with an attenuating device 7 or 7' with particular operational flexibility that enables efficiently attenuating vibrations originating from the blades 5 and acting in a plane orthogonal to axis A. In particular, the attenuating devices 7 and 7' have control units 40 that can control the angle between the respective masses 10 and 11 in a particularly flexible and responsive manner.

This occurs since the coupling between each set of gear teeth 57 and the respective set of gear teeth 55, 55' enables rotating the masses 10, 11 in both directions of rotation about axis A.

In this way, unlike the known solutions described in the introductory part of this description, it is possible to rotate masses 10 and 11 of the respective mass units 8, 9 in the direction that enables reaching the desired position more quickly, significantly improving the responsiveness characteristics of the attenuating device 7, 7'.

This is particularly advantageous in the case of sudden changes in the directions of vibrations generated by the mast 50 in the plane of the rotor.

Furthermore, the coupling between each set of gear teeth 57 and the respective set of gear teeth 55, 55' enables reducing the required transmission ratios with respect to the known solutions described in the introductory part of this description.

In consequence, lower torques are required from the actuators with respect to the known solutions described in the introductory part of this description.

This enables limiting the loads on the actuators 58 and further improving the responsiveness characteristics of the attenuating device 7, 7'.

As each set of gear teeth 57 is coupled in a reversible manner with the respective set of gear teeth 55, 55', the masses 10, 11 of the mass units 8, 9 do not remain blocked in the event of failure of the associated actuator 58.

It is thus possible to return these masses 10, 11 of the mass units 8, 9 to a desired position by means of respective springs (not shown).

A further advantage lies in that the attenuating device 7, 7' has a small axial extension, due to the fact that the masses 10, 11 of the mass units 8, 9 are axially interposed between the actuators 58 of the mass units 8, 9.

In other words, the attenuating device 7, 7' has an extension in the direction parallel to the rotation axis A of the mast 50 that substantially does not exceed that of the flow conveyor 6 and therefore does create negative consequences of an aerodynamic nature.

In addition, the axial extension is also limited, due to the fact that first epicyclic train comprises portions in common with the second epicyclic train.

Another advantage lies in the low maintenance of the attenuating device 7 and 7', due to the use of self-lubricating gear teeth.

Lastly, the masses 10, 11 of each mass unit 8, 9 are radially movable with respect to axis A.

In consequence, the centrifugal forces due to the rotation of the masses 10, 11 of each mass unit 8, 9 are discharged on the shell 12.

This substantially reduces the flexural loads acting on the auxiliary shafts 16, 17 and on other members of the transmission device 15.

Finally, it is clear that modifications and variants can be made regarding the rotor 3, 3' described and illustrated herein without departing from the scope defined by the claims.

In particular, the control units 40 could cause the additional rotation of just the support assemblies 41, 41' and just masses 10 about axis A with respect to the associated auxiliary shafts 16, 17. In this condition, the support assemblies 42, 42' and masses 11 would rotate integrally with the associated auxiliary shaft 16, 17.

The masses 10 and 11 could have different values from each other.

The rotor 3 could also be used in a convertiplane instead of in a helicopter 1.

Finally, the rotor according to the present invention could be the tail rotor of the helicopter 1 instead of the main rotor 3.

The invention claimed is:

1. A rotor (3, 3') for a hover-capable aircraft (1), comprising:
   a hub (4) rotatable about a first axis (A) and comprising a plurality of blades (5);
   a mast (50) connectable to a drive member of the aircraft (1) and operatively connected to the hub (4) to drive, in use, the hub (4) in rotation about the first axis (A);

an attenuating device (7, 7') configured to attenuate the transmission of vibrations from the mast (50) in a plane orthogonal to the first axis (A); and a transmission device (15) configured to transfer, in use, the rotation of the mast (50) about the first axis (A) to the attenuating device (7, 7');

wherein the attenuating device (7; 7') comprises at least a first mass unit (8, 9) and a second mass unit (9, 8); each first mass unit (8, 9) and second mass unit (9, 8) comprising at least a first mass (10, 11) and a second mass (11, 10);

the first mass (10, 11) and the second mass (11, 10) of the first and second mass units (8, 9; 9, 8) being rotatable about the first axis (A) and being operatively connected to the mast (50) so as to respectively generate a first centrifugal force and a second centrifugal force on the mast (50) having respective main components in a direction radial to said first axis (A);

wherein the transmission device (15) is configured to drive, in use, the first mass unit (8; 9) and the second mass unit (9; 8) in rotation about the first axis (A) with, respectively, a first rotational speed ((N−1)*Ω; (N+1)*Ω)) and a second rotational speed ((N+1)*Ω; (N−1)*Ω) with respect to the mast (50) and in opposite directions to each other;

wherein the attenuating device (7, 7') further comprises two control units (40), one operatively connected to the first mass unit (8; 9) and the other to the second mass unit (9; 8), and each selectively operable to cause an additional rotation of at least one of the first and second masses (10, 11) of the associated first and second mass units (8, 9; 9, 8) with respect to the transmission device (15) and selectively control the relative angle between the first mass (10; 11) and the second mass (11; 10) of the associated first and second mass units (8, 9; 9, 8);

wherein each first mass unit (8; 9) and second mass unit (9; 8) comprises a respective first support assembly (41, 42) carrying the respective first mass (10; 11) and a respective second support assembly (42, 41) carrying the respective second mass (11; 10);

wherein each control unit (40) is operatively coupled to at least the respective first support assembly (41, 42) to cause it to rotate about said first axis (A) with respect to the transmission device (15) and control the relative angle between the first mass (10; 11) and the second mass (11;10) of the corresponding first or second mass units (8, 9; 9, 8);

each control unit (40) comprising at least:

a set of drive gear teeth (55, 55') integral with the respective first support assembly (41, 42);

a cogwheel (56) provided with a respective set of control gear teeth (57) meshing with the drive gear teeth (55, 55') and rotatable about a second axis (F) parallel to the respective first axis (A); and an actuator (58) operable to cause, in use, the rotation of the cogwheel (56) about the second axis (F) and cause the rotation of the respective first mass (10, 11) about said first axis (A);

characterized in that each said actuator (58) is configured to cause a selective rotation of respective cogwheel (56) in both directions of rotation about said first axis (A);

each set of control gear teeth (57) and respective set of drive gear teeth (55, 55') enabling the rotation of said first mass (10; 11) and second mass (11; 10) in both directions of rotation about said first axis (A).

2. The rotor according to claim 1, wherein each first actuator (58) comprises an output shaft (60) connected coaxially to the respective cogwheel (56).

3. The rotor according to claim 1 or 2, wherein each control unit (40) comprises an annular element (59) connected to the respective first support assembly (41, 42) and carrying the respective drive gear teeth (55, 55') on its circumferential edge with respect to the respective first axis (A).

4. The rotor according to claim 3, wherein the drive gear teeth (55) are radially external or internal with respect to the respective first axis (A).

5. The rotor according to claim 1, wherein each of the first mass unit (8; 9) and second mass unit (9; 8) comprises a respective base support (45) rotatable about the first axis (A) and operatively connected to the transmission device (15) to be, in use, driven in rotation about the first axis (A) with the first and second rotational speeds (((N−1)*Ω); ((N+1)*Ω)), respectively;

wherein the respective first support assembly (41, 42) is connected in a rotatable manner to the respective base support (45) on a first side of the respective base support (45) and the respective actuator (58) is integrally connected to the respective base support (45) on a second side of the respective base support (45) axially opposite to the first side, when proceeding along said first axis (A).

6. The rotor according to claim 1, wherein the first and second masses (10, 11) of the first and second mass units (8, 9; 9, 8) are axially interposed between the associated actuators (58).

7. The rotor according to claim 1, wherein the first and second masses (10, 11; 11, 10) of the first and second mass units (8, 9; 9, 8) are arranged radially external with respect to the associated actuators (58).

8. The rotor according to claim 1, wherein both the first support assembly (41; 42) and the second support assembly (42; 41) of the first and second mass units (8, 9; 9, 8) are rotatable about the first axis (A) with respect to the transmission device (15);

each control unit (40) further being operatively coupled to the respective second support assembly (42, 41) as well, to cause its rotation about said first axis (A).

9. The rotor according to claim 1, wherein the sets of drive gear teeth (55) of said first and second support assemblies (41, 42) are axially superimposed on each other and arranged at the same radial distance from the first axis (A).

10. The rotor according to claim 1, wherein the sets of drive gear teeth (55') of said first and second support assemblies (41, 42) are arranged at mutually different radial distances from said first axis (A) and radially face each other.

11. The rotor according to claim 1, wherein each first mass (10, 11) and each second mass (11, 10) is coupled to the respective first and second support assembly (41, 42; 42, 41) in a radially movable manner so as to be, in use, pushed against a radially inner wall of a shell (12) of the attenuating device (7, 7').

12. The rotor according to claim 1, wherein the transmission device (15) comprises at least:

a first auxiliary shaft (16) angularly integral with the first mass unit (8; 9) and rotatable about the first axis (A);

a second auxiliary shaft (17) angularly integral with the second mass unit (9; 8) and rotatable about the first axis (A); and a transformation unit (18) functionally coupled to the mast (50) and to the first and second auxiliary shafts (16, 17) and configured to receive motion from the mast (50) and transfer the motion to the first and second auxiliary shafts (16, 17) so that the first auxiliary shaft (16) and the second auxiliary shaft (17), in use, rotate about the first axis (A) with the first rotational speed ((N−1*Ω) in the same direction of rotation as the mast (50) and with the second rotational speed ((N+1)*Ω) in the opposite direction to the direction of rotation to the mast (50), respectively.

13. The rotor according to claim 1, wherein the first rotational speed is equal to (N−1)*Ω and the second rotational speed is equal to (N+1*Ω, where N is the number of blades (9) and Ω is the rotational speed of the mast (50), in a reference system integral with the fuselage (2);
   wherein the first mass unit (8; 9) is rotatable in the same direction as the mast (50); and
   wherein the second mass unit (9; 8) is rotatable in the opposite direction to the mast (50).

14. The rotor according to claim 1, wherein the transmission device (15) comprises:
   a first epicyclic train functionally interposed between the mast (50) and the first auxiliary shaft (16); and
   a second epicyclic train functionally interposed between the mast (50) and the second auxiliary shaft (17);
   the first epicyclic train comprising a portion in common with the second epicyclic train.

15. The rotor according to claim 1, wherein the drive gear teeth (55, 55') and the control gear teeth (57) are made of a self-lubricating material and/or polymer material.

* * * * *